United States Patent
Eichen et al.

(10) Patent No.: US 6,292,539 B1
(45) Date of Patent: Sep. 18, 2001

(54) METHOD AND APPARATUS FOR DIGITAL SUBSCRIBER LOOP QUALIFICATION

(75) Inventors: Elliot Eichen, Arlington; David L. Brooks, Maynard, both of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/086,386

(22) Filed: May 29, 1998

(51) Int. Cl.[7] ................................................ H04M 1/24
(52) U.S. Cl. ................ 379/1.04; 379/27.01; 379/27.03; 379/29.09
(58) Field of Search .................. 379/29, 6, 5, 1, 379/9, 10, 22, 28, 26, 1.01, 1.03, 1.04, 9.01, 14.01, 10.01, 12, 15.03, 21, 22.02, 22.03, 22.04, 26.01, 27.01, 27.03, 29.09, 32.04

(56) References Cited

U.S. PATENT DOCUMENTS

| | | | |
|---|---|---|---|
| 5,128,619 | * | 7/1992 | Bjork et al. ................................ 379/6 |
| 5,181,198 | | 1/1993 | Lechleider .......................... 370/32.1 |
| 5,504,896 | | 4/1996 | Schell et al. .......................... 395/650 |
| 5,864,602 | * | 1/1999 | Needle ...................................... 379/6 |
| 5,881,130 | * | 3/1999 | Zhang ...................................... 379/6 |
| 5,920,609 | * | 7/1999 | Toumani et al. ........................ 379/29 |
| 5,966,427 | * | 10/1999 | Shaffer et al. ........................... 379/29 |
| 5,978,449 | * | 11/1999 | Needle ...................................... 379/6 |
| 6,058,162 | * | 5/2000 | Nelson et al. ........................... 379/27 |
| 6,084,946 | * | 7/2000 | Beierle .................................... 379/30 |
| 6,091,713 | * | 7/2000 | Lechleider et al. .................... 379/27 |
| 6,177,801 | * | 1/2001 | Chong .................................. 324/520 |
| 6,192,109 | * | 2/2001 | Amrany et al. ......................... 379/30 |
| 6,215,854 | * | 4/2001 | Walance ................................. 379/21 |
| 6,215,855 | * | 4/2001 | Schneider .............................. 379/22 |

* cited by examiner

*Primary Examiner*—Curtis Kuntz
*Assistant Examiner*—Rexford Barnie
(74) *Attorney, Agent, or Firm*—Leonard Charles Suchyta; James K. Weixel

(57) ABSTRACT

A system and methodology for qualifying a twisted pair copper loop for digital subscriber loop services are described. The system automatically queries telecommunications provider database records and/or requests measurements from network switching equipment or testing systems to obtain data regarding the twisted pair copper loop, such as loop length, electrical characteristics, and other loop topology characteristics such as wire gauge, the presence of load coils, and the presence of bridge taps. The system determines which digital subscriber loop services are available for the copper loop based on the combination of all data obtained. The system may be implemented in part as an expert system with a knowledge base of qualification rules used in the decision-making process.

14 Claims, 4 Drawing Sheets

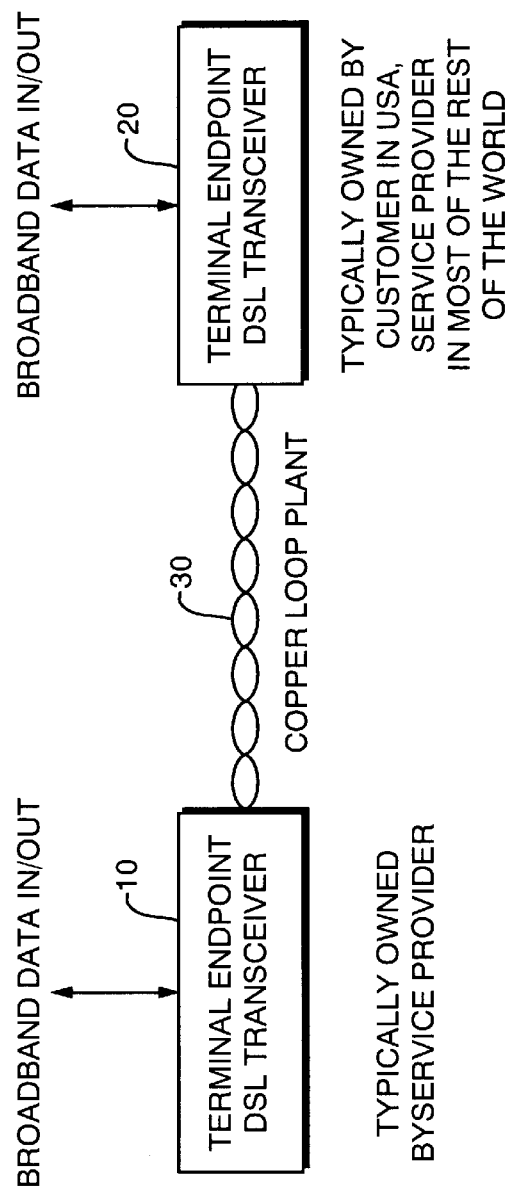
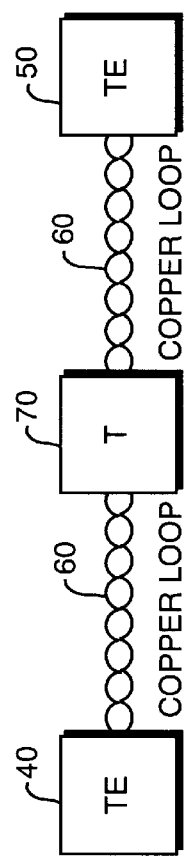
FIG. 1
FIG. 2

METHOD AND APPARATUS FOR DIGITAL SUBSCRIBER LOOP QUALIFICATION

BACKGROUND OF THE INVENTION

The present invention relates to digital subscriber loop technology and, more specifically, to the qualification of existing twisted pair copper loops for digital subscriber loop service.

Digital subscriber loop technology is the digital encoding of all information transmitted on the local loop, i.e., the connection between a customer's premises (home, office, etc.) and a telecommunications provider's central office serving the customer's premises. Most existing local loops in the United States and throughout the world are twisted pair copper loops, originally designed for analog service, or plain old telephone service (POTS). With digital subscriber loop technology, high speed access to the Internet, advanced telephony functions, and multimedia services is possible over the twisted pair copper access network. Digital subscriber systems can provide data from speeds of 64 kb/second in both upstream and downstream directions to over 10 Mb/second in a single direction. Digital subscriber loop technology, often referred to as "xDSL" where x stands for any of a number of letters, includes the following:

- ADSL, Asymmetric Digital Subscriber Loop
- VDSL, Very High-Speed Digital Subscriber Loop
- HDSL, High Data Rate Digital Subscriber Loop
- SDSL, Symmetric Digital Subscriber Loop
- IDSL, ISDN-based Digital Subscriber Loop
- RADSL, Rate Adaptive Digital Subscriber Loop
- ISDN, Integrated Digital Service Network Some of these digital subscriber loop technologies (e.g., HDSL, ISDN, and in particular ADSL) have been standardized by various standards bodies with respect to modulation format, bandwidth, and embedded operations channels, while others have not been standardized and are available from different vendors in a wide variety of modulation formats, upstream/downstream bandwidths, and operation channels.

As illustrated in FIG. 1, digital subscriber loop technology consists of two terminal endpoints (TEs) 10 and 20, which provide conversion, modulation, transmission, and reception of data, and copper loop 30 connecting TEs 10 and 20. TE 10 is typically owned and operated by the service provider, while TE 20 is typically at the customer's premises. In the United States, TE 20 is typically owned or rented by the customer, while in most other parts of the world TE 20 is typically owned and operated by the service provider. In addition, the digital subscriber loop topology can include terminal equipment, such as a repeater, between the two terminal endpoints to provide additional network flexibility or to boost signal strength and transmission distances. For example, FIG. 2 illustrates network terminal 70 in copper loop 60 between TEs 40 and 50.

Digital subscriber loop services, however, cannot be carried over all twisted pair copper loops that support POTS service. The various digital subscriber loop technologies have complex (real and imaginary) signal attenuation restrictions that depend upon downstream (to the customer) and upstream (from the customer) bandwidth, modulation format, and receiver sensitivity for a particular chip set used by a vendor terminal endpoint equipment. Signal attenuation itself depends on several factors, including the length and gauge of the copper wires contained in the loop, the environment in which the copper wires are placed (including temperature variations), and the quality of connections (e.g., splices and terminal connections) that attach the different sections of wire contained in a given loop. Digital subscriber loop technologies also have restrictions on loop topology, such as the position and number of bridge taps and load coils, and restrictions on services provided in adjacent copper pairs in the same binder group (i.e., a group of twisted pairs bundled together) because of crosstalk between pairs and overlapping frequency spectrums.

FIG. 3 illustrates a typical copper loop between central office (CO) 80 and terminal endpoint 82, made up of several different lengths of wire of different gauges spliced together. One leg of the loop terminates at terminal endpoint 82, while two other legs are unterminated, resulting in bridge taps 84 and 86. The loop in FIG. 3 also includes two load coils, 88 and 90, as well as cross connect 92.

As an example of loop topology requirements, a loop is restricted to less than approximately 5.25 km of 24 gauge wire when the digital service is provided at the rate of 1.5 Mb/second downstream and 80 kb/second upstream for a commonly available chip sent that uses carrierless amplitude phase (CAP) modulation for ADSL. For this modulation format and bandwidth allocation, if there is an analog carrier POTS service in the same wire binder group, the ADSL modulation will interfere with the analog carrier, effectively destroying the POTS service. Similarly, if there is a T1 carrier system in the same wire binder group, the T1 service will interfere with the ADSL modulation, nullifying the digital subscriber service, but typically not affecting the T1 service. The number of copper pairs and the potential for crosstalk in a binder group depends on the type and manufacturer of the copper cable.

Today, when a customer wishes to order a digital subscriber loop service, the local telecommunications service provider must determine whether the customer's existing twisted pair copper loop can support the requested digital subscriber loop service at the desired bandwidth. This can be a difficult and time-consuming task to perform manually because of the many restrictions on loop topology and services just described. All necessary data may not be available to a person trying to qualify a loop for digital subscriber loop services, particularly because telecommunications providers often have data in many different databases or stored in paper records. Even if data is available, data concerning outside plant information such as loop length and topology is often out of date. Also, certain metallic loop electrical data is not stored in a database and can only be determined by a measurement or test system.

It is desirable, therefore, to provide a system and methodology for determining which digital subscriber loop technologies can be supported by a particular twisted pair copper loop. It is more desirable to qualify a copper loop for digital subscriber loop services on the basis of real-time electrical measurements as well as records stored in telecommunications provider databases. It is even more desirable to provide an automated system for digital subscriber loop qualification that economically determines which digital subscriber loop technologies can be supported by a copper loop. It is also desirable to implement such a system as an expert system containing a knowledge base of rules.

SUMMARY OF THE INVENTION

The present invention satisfies those desires by providing a system and methodology for qualifying a twisted pair copper loop for digital subscriber loop services. The system automatically queries telecommunications provider database records and/or requests measurements from network switching equipment or testing systems to obtain information regarding the twisted pair copper loop in question. The system then determines which digital subscriber loop services are available for the copper loop based on the combination of all information obtained.

A method consistent with the present invention for qualifying a twisted loop pair for a digital subscriber service comprises the steps of receiving as input a unique identifier corresponding to the loop, determining a topology corresponding to the loop, and determining whether the loop meets topology restrictions of the digital subscriber service. Another method consistent with the present invention comprises the steps of receiving data corresponding to physical characteristics of the loop and applying a plurality of rules to the data to determine whether the loop is suitable for the digital subscriber service. Other methods consistent determine whether electrical characteristics of the loop meet restrictions of the digital subscriber service and whether services provided on other cable pairs in the same binder group with the loop are compatible with the digital subscriber service.

Systems are also provided for carrying out the methodologies of the present invention.

The advantages accruing to the present invention are numerous. A loop qualification system and method consistent with the present invention reduce the time for determining which digital subscriber loop services a particular copper loop supports from several hours to a few minutes. A system and method consistent with the present invention also provide a substantially more accurate result, in part because they use real-time electrical measurements to determine many topological characteristics of the copper loop.

The above desires, and other desires, features, and advantages of the present invention will be readily appreciated by one of ordinary skill in the art from the following detailed description of the preferred implementations when taken in connection with the accompanying drawings.

BRIEF DESCRIPTION OF THE DRAWINGS

FIG. 1 illustrates digital subscriber loop technology connecting two terminal endpoints;

FIG. 2 illustrates digital subscriber loop technology with network terminal equipment between two terminal endpoints;

DETAILED DESCRIPTION OF THE PREFERRED EMBODIMENTS

A system consistent with the present invention automatically qualifies twisted pair copper loops for digital subscriber loop services. Generally, a method for qualifying loops for digital subscriber loop services consistent with the present invention includes at least four types of qualification:

(1) Service Availability: Is the point at which the copper loop terminates equipped to provide the requested digital subscriber service?

(2) Length Qualification: Which digital subscriber loop services at which bandwidths can be provided given the length of the loop?

(3) Line Qualification: Is the loop physically suitable for use by a digital subscriber loop technology? Is the service currently provisioned on the loop compatible with digital subscriber loop service?

(4) Are the services provided on the other twisted pairs in the same binder group with the loop spectrally compatible with digital subscriber loop services?

In order to answer these loop qualification questions, a system consistent with the present invention combines results obtained from testing the copper loop, results from queries of telecommunication provider database records, and information regarding the transmission and receiver characteristics of the digital subscriber.

Figure 4:
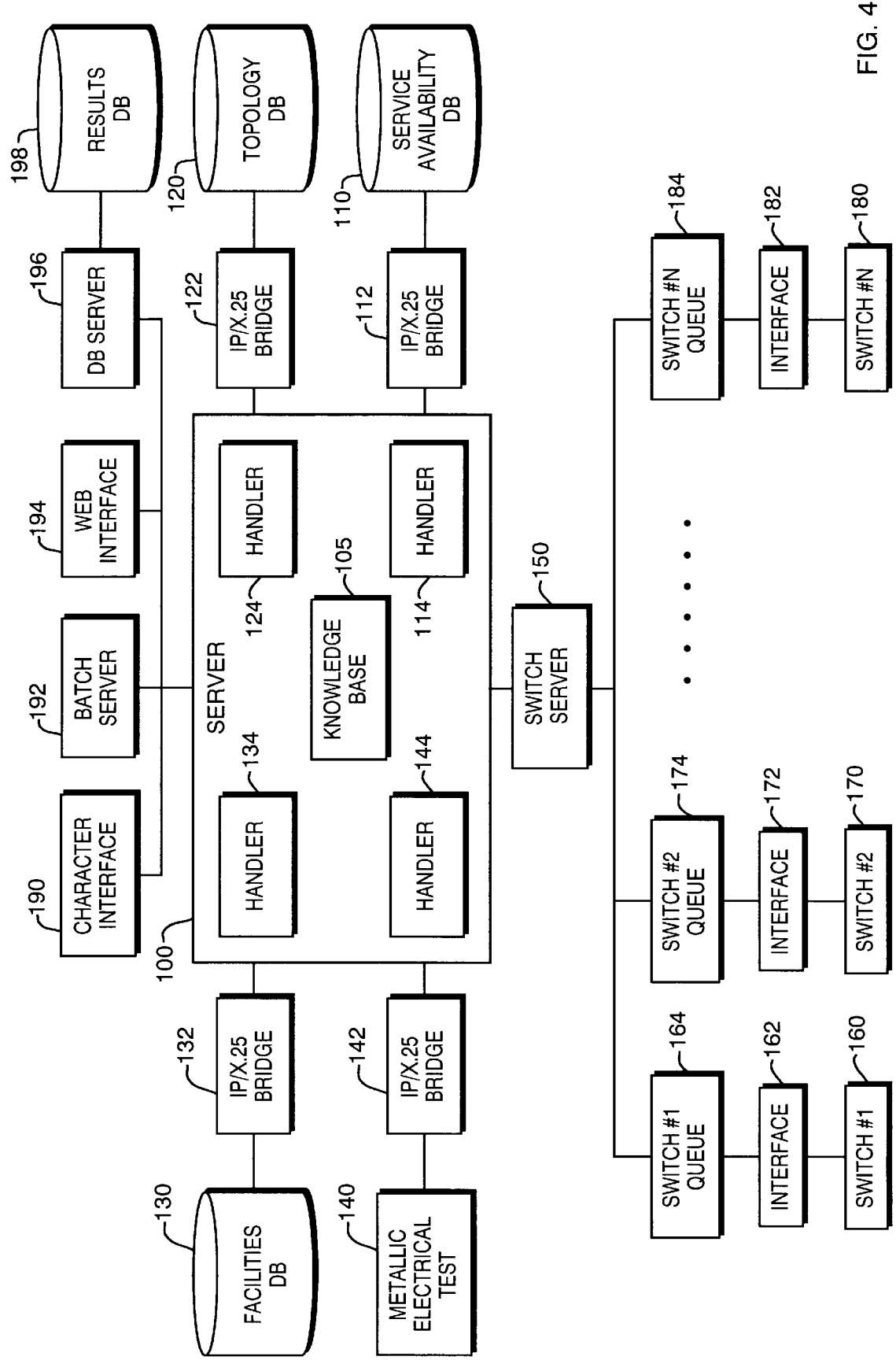
FIG. 4 illustrates the architecture of a loop qualification system consistent with the present invention.

FIG. 4 illustrates the architecture of a system for qualifying loops consistent with the present invention, which may be implemented, for example, as an expert system using a conventional client-server architecture known in the art. The expert system is implemented in software residing on server 100 and performs loop qualification by combining input from a number of information sources with rules contained in knowledge base 105. Specifically, server 100 obtains information from service availability database 110, topology database 120, facilities database 130, and metallic electrical test system 140. Databases 110, 120, and 130, and test system 140 are typically owned and operated by the local telecommunications provider. It will be recognized by one skilled in the art that each database shown in FIG. 4 may actually consist of several smaller databases or, alternatively, that databases may be combined, since each telecommunications provider organizes its data into databases in different ways. Server 100 interfaces to the databases and test system via a suitable communications protocol such as IP or X.25, provided by interfaces 112, 122, 132, and 142. Server 100 additionally includes software handler modules for receiving and processing information obtained from databases 110, 120, and 130, and test system 140.

Server 100 also receives information and test results directly from central office switches in the local network, three of which are shown in FIG. 4 as switches 160, 170, and 180 for illustrative purposes. Server 100 is coupled to switch server 150, which is coupled to switch queues 164, 174, and 184, corresponding to switches 160, 170, and 180, respectively. Switch queues 164, 174, and 184 access data from switches 160, 170, and 180 via interfaces 162, 172, and 182, respectively. It will be recognized by one skilled in the art that switch server 150 need not be separate from server 100.

Consistent with the present invention, a user may access server 100 through either the graphical user interface of client 194, e.g., a World Wide Web-based client, or character interface 190, e.g., a VT100 character interface. Regardless of the interface used, a user will typically enter a unique number (e.g., a telephone directory number (TDN) or an IP address) or identifier (e.g., a circuit identifier) associated with the copper loop for which qualification is desired. A system consistent with the present invention also includes batch server 192, which allows qualification of numerous loops to be performed in batch, and database server 196 for storing results in results database 198.

Figure 5:
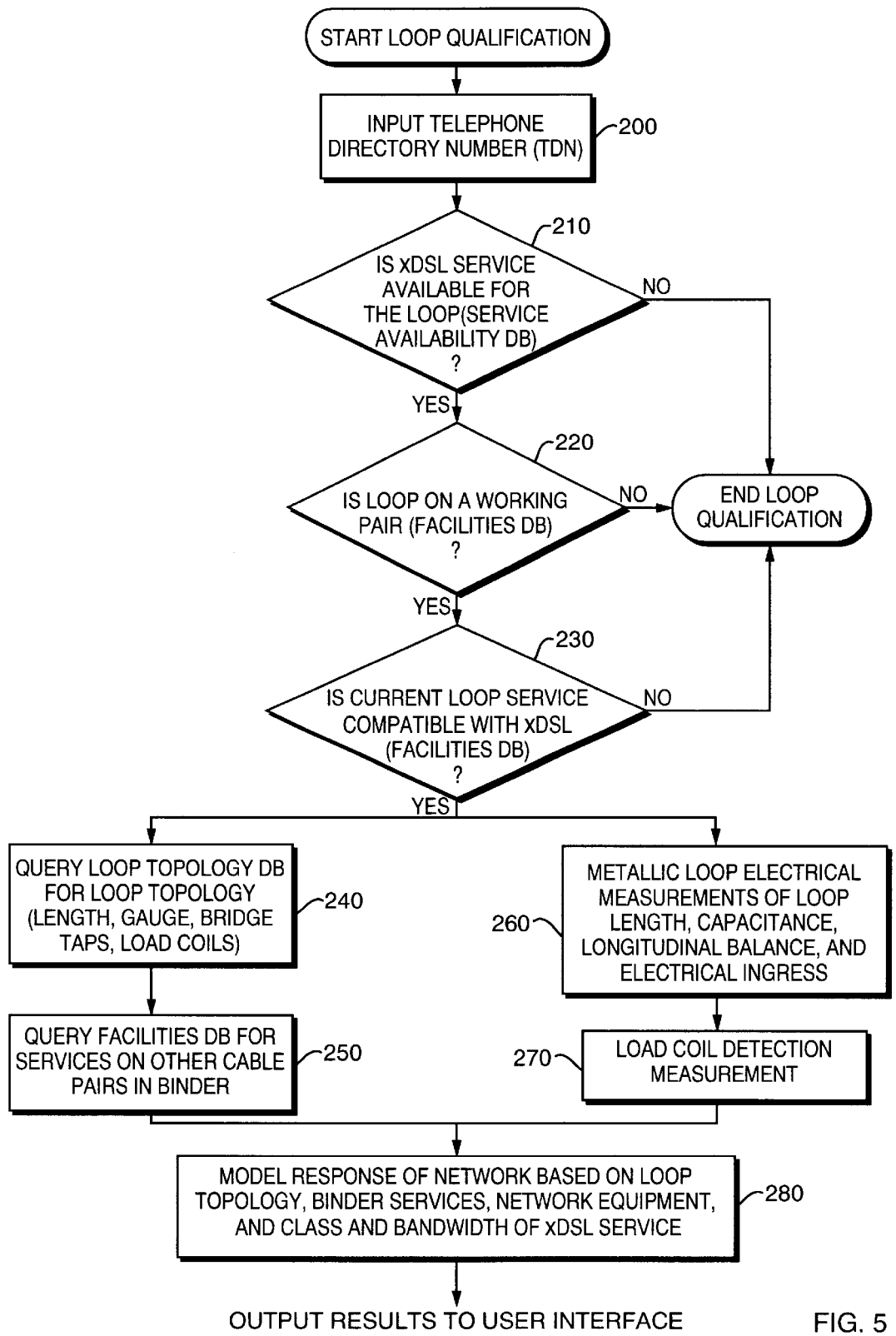
FIG. 5 is a flow chart of a method for qualifying loops consistent with the present invention.

FIG. 5 is a flow chart illustrating a method for qualifying loops for digital subscriber loop services consistent with the present invention. Consistent with an embodiment of the present invention, the method is performed by software residing on server 100. The process begins by receiving as input a unique identifier corresponding to the copper loop to be qualified for digital subscriber services (step 200). The unique identifier may be a telephone directory number (TDN) as shown in FIG. 5, or any other unique identifier such as an IP address or a circuit identifier. Also, server 100 may receive the identifier from any input source, including character interface 190 or web interface 194 (if a human user is accessing the system through an interface) and batch server 192 (if several qualification requests have been entered for batch processing). Most of the remaining steps in the process use the unique loop identifier to retrieve information regarding the loop.

Once receiving a loop identifier, the qualification process continues by determining whether digital subscriber loop services are available for the loop (step 210). Consistent with the present invention, the server makes this determination by querying service availability database 110 to determine whether the local telecommunications provider provides xDSL services from the office serving the customer's location. If xDSL service is not available, loop qualification terminates. If xDSL service is available, processing continues to step 220. In an alternate method consistent with the present invention, the server may choose to continue the loop qualification process although xDSL service is not available.

Next, the process determines whether the loop is on a working pair (step 220) by querying facilities database 130. Some measurement tests performed by a loop qualification method consistent with the present invention require that the loop be on a working pair. If the loop is not on a working pair, the server either terminates loop qualification (as shown in FIG. 5) or chooses to continue loop qualification, although not all tests will be available for the loop. Alternatively, the loop may be temporarily assigned to line equipment and a test number so that loop qualification may be performed.

If loop qualification continues, the server determines whether the current service on the loop is compatible with xDSL service (step 230). For example, in the United States the current service cannot be T1 or ISDN. Consistent with the present invention, the server performs this step by querying facilities database 130. As discussed above, it should be apparent to one skilled in the art that, although the queries in steps 220 and 230 both access databases with information regarding facilities, the facilities database shown in FIG. 4 (database 130) may consist of several smaller databases, so that the queries of steps 220 and 230 access two different, smaller databases. If the current service is not compatible, loop qualification ends. If the current service is compatible, then flow proceeds to several data collection steps. In an alternate method consistent with the present invention, the server may choose to continue the loop qualification process although the current service is not compatible with xDSL service.

A method consistent with the present invention performs some or all of data collection steps 240, 250, 260, and 270. These steps are not necessarily performed in a particular order, and some steps may be performed simultaneously. For example, FIG. 5 shows steps 240 and 250 being performed at the same time as steps 260 and 270. Each of these steps involves obtaining information about the loop to be qualified from a database or a test or measurement system in the network, and all of the information obtained is used as input to step 280, which applies a plurality of rules to the information to model the response of the network and determine which digital subscriber services are available on the loop.

Figure 3:
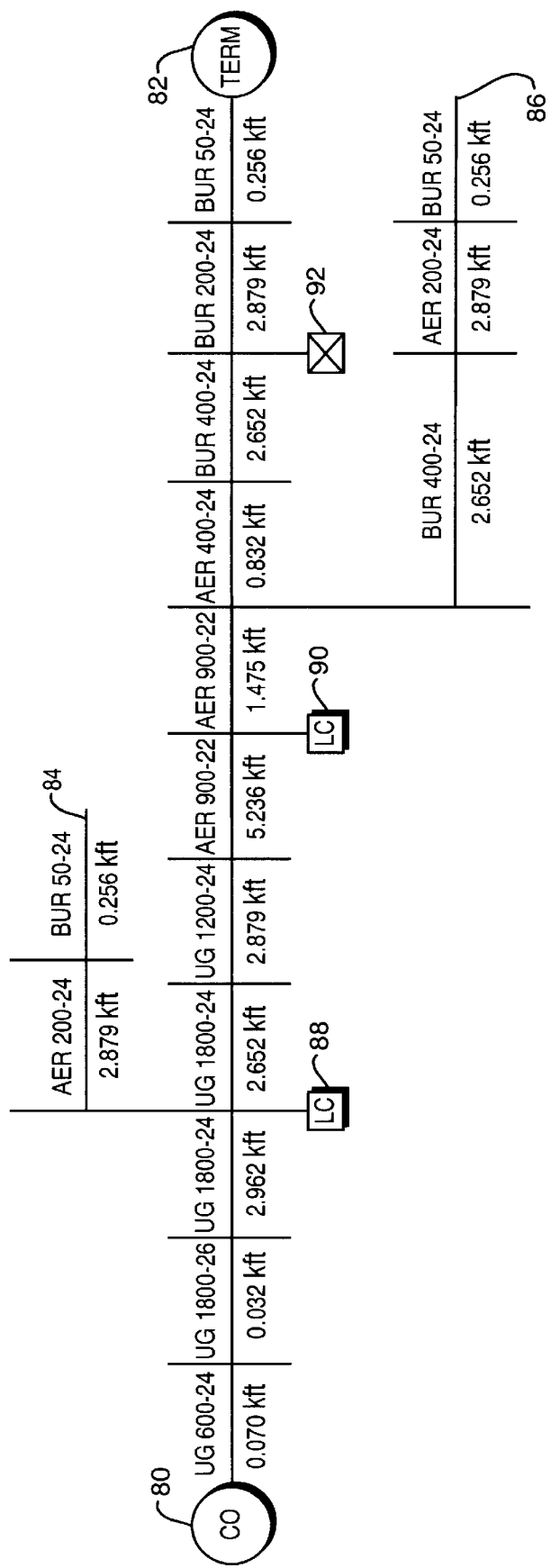
FIG. 3 illustrates a typical digital subscriber loop topology.

In step 240, the server queries topology database 120 using the unique loop identifier (e.g., TDN or IP address) to obtain a variety of loop topology data. In particular, the server requests length and gauge of wire on the loop for each loop segment, cable type, the location of load coils on the loop, and the location and length of bridge taps on the loop. For example, the loop topology shown in FIG. 3 is an example of data that may be obtained from topology database 120. As described above, topology database 120 may consist of several smaller databases, each of which contains different information. Step 240 may also include a query of a separate database (not shown in FIG. 4) that stores recent measurements of the loop length. This data may be more accurate than a topology database operated by the telecommunications provider for storing many different types of loop topology data.

Referring again to FIG. 5, in step 250 the server queries facilities database 130 using the unique loop identifier to determine the services on other cable pairs in the same binder group as the loop to be qualified. This information will be used in step 280 to determine whether xDSL services are spectrally compatible with the services on the other cable pairs in the binder so that crosstalk will not degrade service quality.

In step 260, the server requests measurements from metallic electrical test system 140, which is a remote test system such as 4TEL, manufactured by Teradyne, Inc., or Mechanized Loop Test (MLT), manufactured by Lucent Technologies. Consistent with the present invention, the server requests a measure of loop length and/or loop capacitance, which can be converted to loop length using a known mathematical relationship. The server also requests measures of longitudinal balance and wideband and narrowband electrical ingress which will be used in step 280 to determine the suitability of the loop for digital subscriber loop services. As described earlier, tests in step 260 may not be performed if the loop is not on a working pair.

In step 270, the server requests a load coil detection measurement to determine if there are any load coils in the loop. This measurement can be performed at the end office switch at which the loop terminates (e.g., switch 160, 170, or 180 in FIG. 4) or by metallic electrical test system 140. If the server obtains the measurement from the switch, switch server 150 receives measurements from queues 164, 174, and 184, and controls server 100's access to switch measurements. Examples of load coil detection measurements known in the art are a swept frequency measurement and a time domain reflectometry measurement. As descirbed earlier, tests in step 270 may not be performed if the loop is not on a working pair.

All of the information obtained in steps 240, 250, 260, and 270 from database queries and test and measurement systems is input to step 280. Consistent with the present invention, in step 280 an expert system resident on server 100 combines the results of steps 240, 250, 260, and 270 with a plurality of qualification rules from knowledge base 105 and information on network equipment stored in a database (not shown for the sake of clarity) to model the response of the network for the various digital subscriber loop services available to the subscriber. The expert system also determines, for each of the available digital subscriber loop services (e.g., ADSL, VDSL, etc.), how much bandwidth can be supported in both upstream and downstream directions.

Consistent with the present invention, the qualification rules in knowledge base 105 are not limited to any particular set. The rules may range from the simple (e.g., a loop with one or more load coils does not qualify for a digital subscriber loop service) to the more complex (e.g., for a certain type of terminal equipment and a particular digital subscriber loop service with given upstream and downstream bandwidth, a combination of wire length and gauge limits can be calculated according to mathematical relationships to satisfy given signal attenuation and/or bit error rate requirements).

Consistent with the present invention, there may be a conflict between data retrieved from a database and data measured in real-time using a measurement system or test system. In such cases, knowledge base 105 can also include rules for reconciling the differences. For example, if data retrieved from a database is known not to have been updated recently, then a qualification method consistent with the present invention would rely on measured data, which may be more accurate.

The ultimate output of a system consistent with the present invention is a list of digital subscriber loop service packages that the loop can support. For a particular type of xDSL service (e.g., ADSL), there may be multiple packages, each of which defines a different class of service, including upstream and downstream bandwidth. For example, a loop may be able to support an ADSL package with downstream/upstream bit rates of 640k/272k, but the same loop may not support ADSL with bit rates of 640k/680k because of the loop length and topology. Alternatively, a system consistent with the present invention may determine whether a loop can support a specified digital subscriber loop service with given upstream and downstream bandwidths. In this case, the system user may enter the service type and bandwidth desired. In addition to simply listing qualified services, the system may provide the user with diagnostic information explaining why a particular decision was reached.

It will be apparent to those skilled in this art that various modifications and variations can be made to the loop qualification scheme of the present invention without departing from the spirit and scope of the invention. Other embodiments of the invention will be apparent to those skilled in this art from consideration of the specification and practice of the invention disclosed herein. In particular, the method is not limited to implementation in a client/server architecture or as an expert system. Nor is the invention limited to the user interfaces described. For example, a machine application program interface can provide access to the system from another system or as part of a larger provisioning system. A method consistent with the present invention can also be used to qualify loops for other services whose qualification requires access to database and/or real-time measurements. It is intended that the specification and examples be considered exemplary only, with the true scope and spirit of the invention being indicated by the following claims.

We claim:

1. A method for qualifying a twisted pair loop for a digital subscriber service, the method comprising:

querying a service availability database and determining if the digital subscriber service is available on the loop;

querying a facilities database and determining: 1) if the loop is on a working pair, 2) whether a service currently on the loop is compatible with the digital subscriber service, and 3) what other services are active on other cable pairs that share a binder group with the loop;

querying a topology database and obtaining topology data corresponding to the loop;

combining all information retrieved from the service availability database, the facilities database, and the topology database; and modeling a response of the loop using the combined information and a plurality of qualification rules.

2. The method of claim 1 further comprising:

determining whether the digital subscriber service is spectrally compatible with other services on the other cable pairs in the shared binder group.

3. The method of claim 1 further comprising:

performing measurements of the loop using a metallic loop electrical test system.

4. The method of claim 3 wherein the metallic loop electrical test system measures loop length.

5. The method of claim 3 wherein the metallic loop electrical test system measures loop capacitance.

6. The method of claim 3 wherein the metallic loop electrical test system measures longitudinal balance.

7. The method of claim 3 wherein the metallic loop electrical test system measures electrical ingress.

8. The method of claim 3 further comprising:

identifying differences between data received from the metallic loop electrical system and data retrieved from at least one of the service availability database, the facilities database, and the topology database, and reconciling the differences using a series of predetermined rules.

9. The method of claim 1 further comprising:

determining how much bandwidth can be supported in both upstream and downstream directions on the loop.

10. A method for qualifying a twisted pair loop for a digital subscriber service, the method comprising:

querying a service availability database and determining if the digital subscriber service is available on the loop;

querying a facilities database and determining: 1) if the loop is on a working pair, 2) whether a service currently on the loop is compatible with the digital subscriber service, and 3) what other services are active on other cable pairs that share a binder group with the loop;

querying a topology database and obtaining topology data corresponding to the loop;

performing measurements of the loop using a metallic loop electrical test system;

identifying differences between data received from the metallic loop electrical system and data retrieved from at least one of the service availability database, the facilities database, and the topology database;

reconciling the differences using a series of predetermined rules;

combining all information retrieved from the service availability database, the facilities database, the topology database, and the measurements; and modeling a response of the loop using the combined information and a plurality of qualification rules to output a list of digital subscriber services that the loop can support.

11. The method of claim 10 wherein the metallic loop electrical test system measures loop length.

12. The method of claim 10 wherein the metallic loop electrical test system measures loop capacitance.

13. The method of claim 10 wherein the metallic loop electrical test system measures longitudinal balance.

14. The method of claim 10 wherein the metallic loop electrical test system measures electrical ingress.

* * * * *